Aug. 10, 1965
H. C. SCHULZE
3,200,184
PROCESS FOR FORMING HOLLOW ARTICLES
Filed Nov. 15, 1962
3 Sheets-Sheet 2
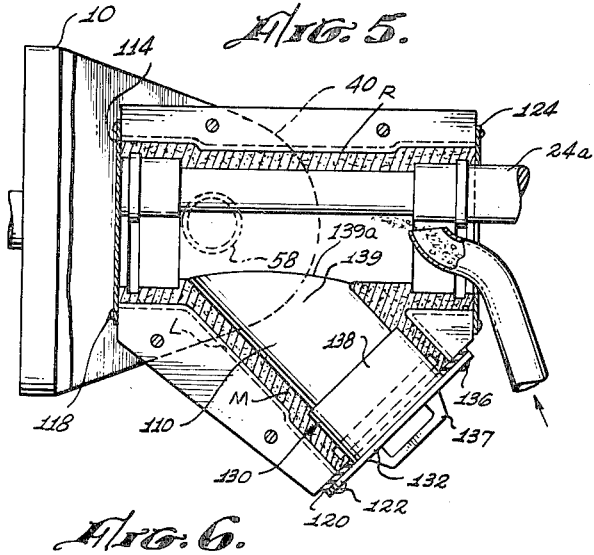
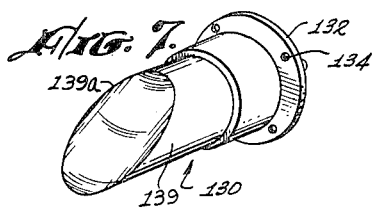
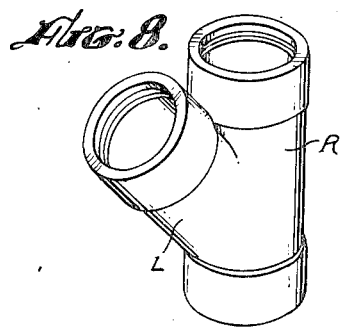
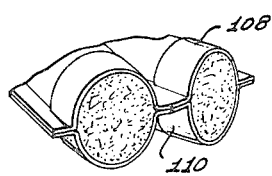
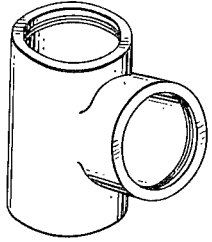
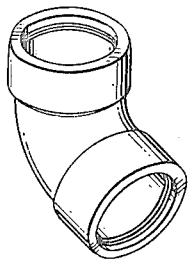
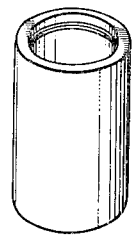
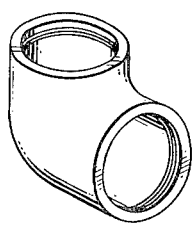
INVENTOR.
HERBERT C. SCHULZE,
BY
Hulwider, Patton, Rieber, Lee & Utecht.
ATTORNEYS.

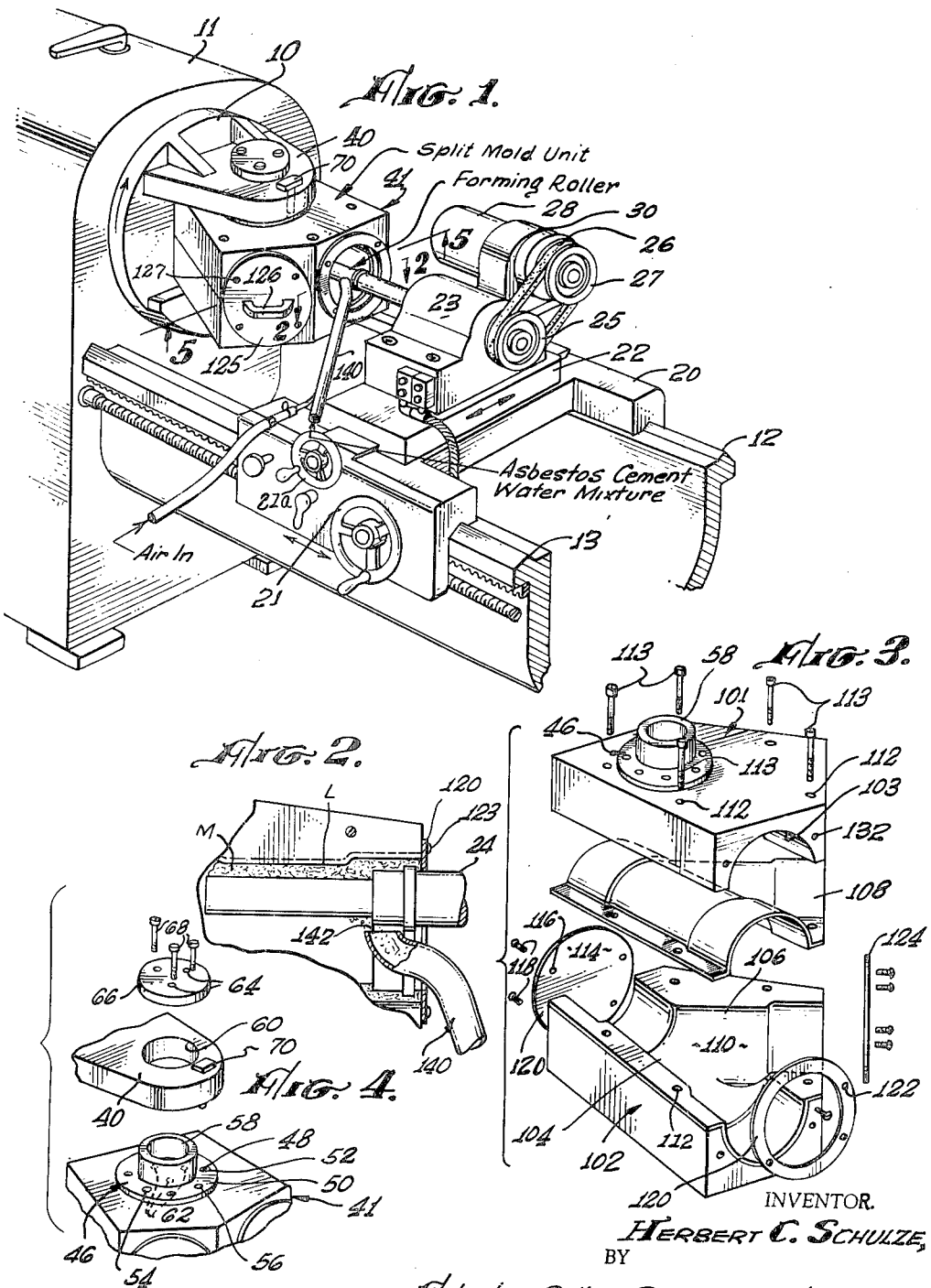

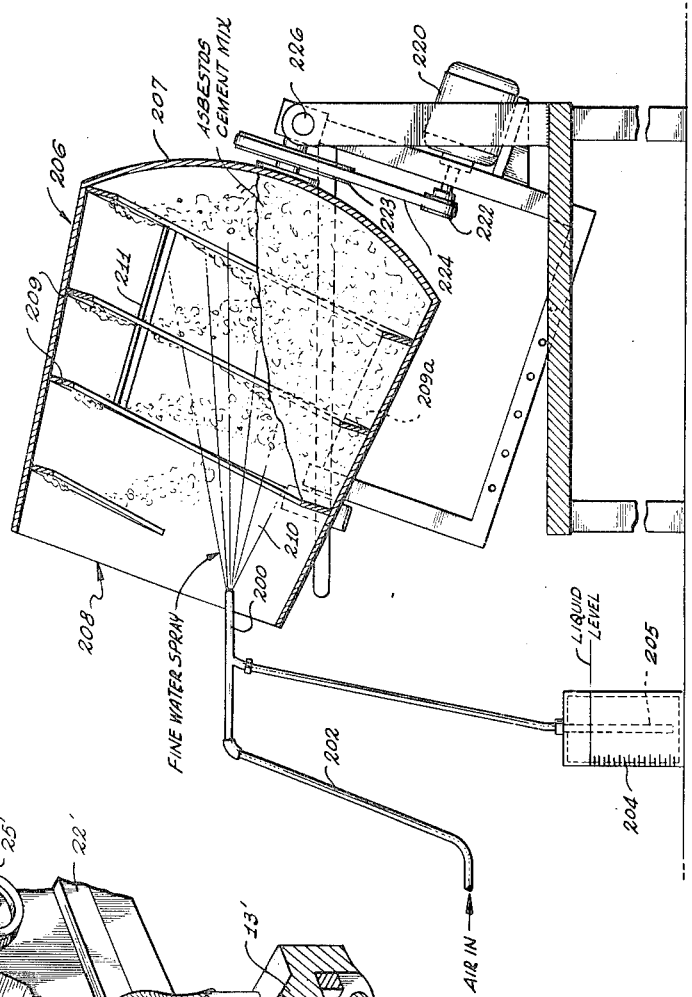
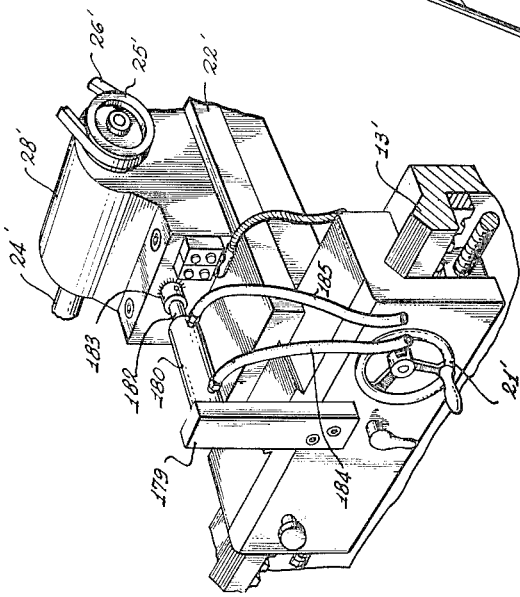

United States Patent Office 3,200,184
Patented Aug. 10, 1965

3,200,184
PROCESS FOR FORMING HOLLOW ARTICLES
Herbert C. Schulze, 3690 Highland Drive,
Carlsbad, Calif.
Filed Nov. 15, 1962, Ser. No. 237,857
11 Claims. (Cl. 264—311)

This invention relates to a new and novel process for forming hollow articles from materials comprising asbestos and cement.

The present invention is particularly directed to the forming of pipe fittings having intersecting passages, in the nature of a "T," "elbow," "lateral" and the like from mixtures of Portland cement, asbestos fibers and water. It has been heretofore proposed to form pipe fittings of this nature from asbestos-cement mixtures by a process wherein the fitting is formed in two or more pieces and thereafter joined by means of a bonding agent. The cost of this process is considerable and additionally the resulting product offers an unattractive appearance. Pipe fittings of this nature have also been formed of cast iron. Cast iron fittings, however, corrode relatively quickly and are comparatively expensive to manufacture.

It is a major object of the present invention to provide a new and novel process of forming hollow articles and particularly pipe fittings having intersecting passages from asbestos-cement mixtures. Pipe fittings formed in accordance with the present invention are much less costly than cast iron fittings and are not subject to corrosion.

Another object is to provide a process of the aforedescribed nature wherein the pipe fittings are integral and afford a smooth, attractive appearance.

Another object is to provide a process of the aforedescribed nature by means of which may be produced hollow articles having a carefully controlled interior configuration without requiring machining to obtain such configuration.

A further object is to provide a process of the aforedescribed nature by means of which is produced hollow asbestos-cement articles of a desired density affording considerable strength over extended over extended periods of use.

A more particular object of the invention is to provide a process wherein the material to be formed is introduced into a molding zone defined in part by a rotating tubular surface and a power-driven roller compresses the material against the rotating surface to thereby form a hollow article of an integral nature.

An additional object of the invention is to provide apparatus for conducting my novel method having two intersecting passage portions that includes a rotating split mold having connecting branches, with the material to be formed being first introduced into one branch to be compressed by a roller into a first passage portion of the pipe fitting, whereafter said mold is shifted to a second position wherein additional material is introduced into the second branch of the mold to be compressed by said roller into a second passage portion of the pipe fitting.

An important object of the present invention is to provide a process of forming hollow articles from asbestos-cement materials that includes tumbling the materials together in a mixing zone while spraying water into said zone to produce a non-cohesive, particulate mass, introducing this mass into a molding zone defined in part by a rotating tubular surface, with a power-driven roller then compressing the mass against the rotating tubular surface to define the article. The material of the configured article is then cured in a known manner.

A further object of the invention is the formation of pipe fittings and the like by means of a rotating split mold and a power-driven roller insertable into said mold.

The foregoing and other objects and advantages of this invention will be clear to those skilled in the art upon reading the following specification in conjunction with the attached drawings in which:

FIGURE 1 is a perspective view of a preferred form of apparatus usable to carry out the process of the present invention;

FIGURE 2 is a fragmentary central sectional view taken in enlarged scale on line 2—2 of FIGURE 1;

FIGURE 3 is a vertically exploded view of the mold unit of said apparatus;

FIGURE 4 is a fragmentary exploded view of an indexing head utilized in said apparatus;

FIGURE 5 is a sectional view of said mold unit taken on line 5—5 of FIGURE 1, but showing said unit shifted from its original position of FIGURES 1 and 2;

FIGURE 6 is a partial end perspective view of a mold liner used with said mold unit, and showing asbestos-cement material packed therein prior to forming;

FIGURE 7 is a perspective view of a plug used in conjunction with said mold unit;

FIGURE 8 is a perspective view of a lateral pipe fitting made in accordance with the present invention;

FIGURE 9 is a perspective view of a T pipe fitting made in accordance with the present invention;

FIGURE 10 is a perspective view of a 45° elbow fitting made in accordance with the present invention;

FIGURE 11 is a perspective view of a 90° elbow fitting made in accordance with the present invention;

FIGURE 12 is a perspective view of a pipe coupling made in accordance with the present invention;

FIGURE 13 is a perspective view showing a modified form of said apparatus; and

FIGURE 14 is a side view in central vertical section showing a preferred means for mixing asbestos-cement material whereby it may be used in carrying out the present invention.

Referring to the drawings and particularly FIGURE 1 thereof, the major components of the preferred form of apparatus utilized with the method embodying the present invention generally resemble the major components of a conventional lathe. Thus, this apparatus has a rotating face plate 10 suitably supported by a housing 11. The housing 11 contains an electric motor that rotates face plate 10, as in the case of a conventional lathe. The details of this arrangement are not shown since the structure and mounting of a lathe face plate and the powering of it is well known to those skilled in the art. A pair of horizontal ways 12 and 13 extend from housing 11 for slidably supporting a carriage 20. A feed arrangement for this carriage 20 includes suitable gearing operated by a handwheel 21 in a conventional manner to effect movement of the carriage horizontally toward the face plate 10 or away from it upon the ways 12 and 13, as indicated by the directional arrows to the left of handwheel 21 in FIGURE 1.

The carriage 20 is also provided with a transverse cross-feed that includes suitable gearing (not shown) operatively interposed between carriage 20 and a support plate 22 whereby the latter may be moved in a transverse direction relative to ways 12 and 13, as indicated by the arrows on FIGURE 1. This gearing is operated by a second handwheel 21a.

Mounted upon the support plate 22 is a roller support 23 that rotatably carries a horizontal forming roller 24. One end of roller 24 is keyed to a pulley 25 that is driven by a belt 26. The belt 26 in turn is driven by a pulley 28 that is rotated by an electric motor 28 mounted on a bracket 30 that extends upwardly from roller support 23. From the foregoing description it will be apparent that the forming roller 24 may be moved both longitudinally and transversely relative to the face plate 10 while such face plate and roller are both undergoing rotation.

Fastened to the face plate 10 or formed integrally therewith is horizontal holding arm 40 or the like. A split mold unit, generally designated 41, is fastened to the holding arm 40 in a manner described hereinafter that it may be shifted relative to the axis of rotation of the face plate. Thus, an indexing fitting, generally designated 46, is rigidly secured to the upper surface of the split mold unit 41 by bolts 48. The indexing fitting 46 includes a horizontal annular element 50 formed with a plurality of bores 52 that receive the bolts 48. The element 50 is also formed with a pair of circumferentially spaced locating holes 54 and 56. An integral collar 58 extends coaxially upwardly from the element 50. The collar 58 is rotatably received within a circular aperture 60 formed in the holding arm 40. Within the confines of the collar 58 the annular element 50 is formed with a plurality of threaded bores 62. Complementary bores 64 are formed in a disc 66 that rests upon the upper surface of holding arm 40. A plurality of bolts 68 extend vertically downwardly through bores 64 to be threadably secured within bores 66 whereby the split mold unit 41 is supported by the holding arm 40. The height of the collar 46 is less than the thickness of the holding arm 40. Accordingly, when the bolts 68 are tightened, the split mold unit 41 will be securely retained in place. The split mold unit is shiftable about a vertical axis extending through the center of the indexing fitting 46, aperture 60 and disc 66 between a first and second position. The split mold unit 41 is selectively retained within these two positions by a generally T-shaped indexing pin 70 insertable within the locating holes 54 and 56, such indexing pin being vertically slidably carried by the free end of the holding arm 40.

Referring now particularly to FIGURES 3 and 5, the split mold unit 41 includes an upper element, generally designated 101, and a complementary lower element generally designated 102. When the upper and lower elements 101 and 102 are joined, their cavities define the outline of a pipe fitting having intersecting passages. The specific form of split mold unit 41 shown in the drawings is adapted for use in forming a pipe fitting commonly termed a "lateral" and shown in FIGURE 8. As indicated in this figure, the lateral includes a runner or body R from which extends a leg L that is shorter than the runner. The mold cavity of the split mold unit includes a main passage to form the runner R and defined by a straight branch 103 in upper mold element 101 and 104 in lower mold element 102. The branch 103 intersects a second short branch (not visible in FIGURE 3) in upper mold element 101, while branch 104 intersects a second short branch 106 in lower mold element 102, with the short branches defining the leg L of the lateral fitting. The mold cavity branches of upper mold element 101 preferably receive a semi-rigid half liner 108 formed of a suitable material such as a synthetic plastic. Similarly, the mold cavity branches 104 and 106 of the lower mold element 102 receive a half liner 110. The upper and lower mold elements 101 and 102 as well as the half liners 108 and 110 are provided with aligned bores 112 which receive a plurality of bolts, studs or the like 113 by means of which these elements of the split mold unit may be rigidly secured together prior to a forming operation.

With continued reference to FIGURE 3 and additional reference to FIGURE 5, the split mold unit 41 is provided with an end cap 114. The end cap 114 is provided with a plurality of bores 116 which receive a plurality of bolts 118 for removably securing the end cap to one end of the assembled mold elements 101 and 102. In this manner the end cap 114 closes the end of the straight branch 103, 104 adjacent the face plate 10. An end ring 120 is provided for the opposite end of the straight branch 103, 104. The end ring 120 is provided with a plurality of bores 122 to receive bolts 123 by means of which the ring 120 may be removably affixed to the mold elements 101 and 102. A second end ring 124 similar to end ring 120 is provided for the outer end of the shorter mold cavity branch. Also, a second end cap 125 similar to end cap 114, but having a handle 126, is provided for the end of the straight branch 103, 104 opposite face plate 10. In FIGURE 1 end cap 125 is shown secured in place by bolts 127.

Referring now to FIGURES 5 and 7, a plug, generally designated 130, is provided for selective insertion into the end of the short mold cavity branch in the manner shown in FIGURE 5. Plug 130 includes a disc 132 formed with a plurality of bores 134 that receive bolts 136 whereby the plug may be secured to the split mold unit 41. A handle 137 is provided on disc 132. On the side of disc 132 opposite handle 137 is formed a boss 138 from which extends a coaxial truncated cylinder 139 of lesser diameter. The end 139a of the cylinder 139 is of concave configuration conforming to the shape of the completed fitting at this point.

The asbestos-cement mixture is introduced into the confines of the split mold unit 41 by suitable means, such means may take the form of a duct 140 having a discharge end 142 which is introduced into the cavities of the split mold unit as shown in FIGURES 1 and 2. The duct 140 is connected to a source of asbestos-cement, with such material being forced through the duct by means of compressed air. Referring now to FIGURE 6, it is also possible to introduce the material to be molded into the split mold unit 41 by packing such material within the confines of the mold liners 108 and 110 before the forming operation commences.

In the operation of the aforedescribed apparatus, the leg L of the fitting is preferably formed first. Hence, the split mold unit will be arranged as shown in FIGURE 1. At this time the longitudinal axis of the shorter mold cavity is in alignment with the axis of rotation of the face plate 10. The end caps 114 and 125 and end rings 120 and 124 are secured in place. If the duct 140 is utilized to introduce the asbestos-cement mixture, such material is progressively admitted within the mold cavity while face plate 10 and forming roller 24 are undergoing rotation.

Referring now to FIGURES 2 and 5, the forming roller 24 will preferably have a length approximating the length of the long side of the shorter branch of the mold cavity. As the asbestos-cement mixture M is blown into the mold, it will be compressed by the forming roller 24 against the outer portion of the mold cavity. It has been determined that the split mold unit 41 and the forming roller 24 should rotate in the same direction, with their relative speeds being so controlled that the surface speed of the forming roller 24 is at least equal to the surface speed of the asbestos-cement material at the area of contact of the roller and such material. Preferably, the surface speed of the forming roller, however, should exceed the surface speed of the asbestos-cement material at this area of contact. The roller's surface speed should not fall appreciably below the surface speed of the asbestos-cement material at this area of contact.

As the asbestos-cement material is introduced into the shorter branch of the split mold unit it will be progressively compressed by the forming roller 24 to achieve the desired density. During this operation, the end caps 114 and 125, respectively, prevent the asbestos-cement material from being discharged from the short branch of the mold cavity at the end thereof adjacent the face plate 10 and from the opposite end of the branch 103, 104. As indicated particularly in FIGURE 2, the end ring 124 serves to define one end of the fitting by permitting the asbestos-cement material M to be compressed axially against the inner surface of such end ring. Control of the thickness and density of the asbestos-cement material during such compression is effected by the position of the forming roller 24, with control over the position of the forming roller being effected in turn by the second handwheel 21a. This compression will be continued until the leg L of the lateral fitting has been formed.

After the leg L of the fitting has been formed in the above-described manner, the handwheel 21 will be manipulated to withdraw the forming roller 24 from within the split mold unit. Next, the plug 130 will be inserted within the short branch of the mold cavity and affixed in place by means of the bolts 136. The indexing pin 70 will be withdrawn from the locating hole 56 wherein it was first located and the split mold unit shifted so as to align the other indexing hole 54 with the indexing pin 70. The indexing pin 70 is then lowered into hole 54 to lock the split mold unit in its shifted position. It should be particularly noted as indicated in FIGURE 5, the forming roller 24 has been replaced by a longer forming roller 24a. The forming roller 24a is provided with an interior longitudinal axial configuration corresponding to that of the runner R of the lateral fitting.

With the longer forming roller 24a in place, the handwheel 21 is again manipulated so as to insert the forming roller 24a within the long branch of the split mold unit. Next, the asbestos-cement material M is forced into the mold cavity by means of the duct 140. As the asbestos-cement material is introduced into the long branch of the split mold unit it will be progressively compressed by the forming roller 24a to provide the desired density. During this operation the end cap 114 and end ring 124 will define the opposite ends of the runner R of the lateral fitting by permitting the asbestos-cement material M to be compressed axially against the inwardly-facing surfaces of said end cap and said end ring. The plug 130 will provide a positive support for the cement-asbestos material in the area of the intersection of the runner R and the leg L of the fitting. The plug 130 will also prevent the asbestos-cement material from being discharged through the leg L of the fitting during this step in the operation. Control of the thickness and density of the asbestos-cement material M is effected by the position of the forming roller 24, with control over the position of this forming roller being effected in turn by the second handwheel 21a.

This step of the operation is shown in FIGURE 5. Referring thereto it should be noted that the mold cavity of the split mold unit and the forming roller 24a respectively cooperate to determine the external and internal axial configuration of the runner R of the completed lateral fitting. Similarly, the mold cavity and the shorter forming roller 24 respectively cooperate to define the external and internal configuration of the leg L of the completed lateral fitting.

After the long branch of the fitting has been formed in the above-described manner, the handwheel 21 will again be manipulated to withdraw the forming roller 24a from within the split mold unit. Preferably, the completed fitting will be permitted to remain within the split mold unit for an initial curing period of time varying up to four hours depending upon the complexity of the fitting and the nature of the asbestos-cement mixture.

The split mold unit will then be disassembled and the fitting removed for final curing in a conventional manner. It is a particular advantage of the present invention that no machining of the fitting is necessary inasmuch as the final external and internal configuration thereof is defined within the split mold unit during the forming steps.

Referring now to FIGURE 13, there is shown a modified form of apparatus constructed in accordance with the present invention. The modified form of apparatus is substantially identical to that shown in FIGURES 1 through 7 with the exception of the means utilized to effect positioning of the forming roller and in FIGURE 13 like parts bear primed reference numerals. The housing of the modified form of apparatus is provided with a fixed upstanding post 179, the upper end of which is secured to one end of a conventional double-acting hydraulic cylinder transversely arranged relative to the axes of rotation of the face plate and the forming roller 24'. A plunger 182 extends from the side of the hydraulic cylinder 180 opposite post 179. The outer end of the plunger 182 is secured to the support plate 22' by means of a fitting 183. Reciprocation of the plunger 182 is effected by means of fluid conduits 184 and 185 through conventional control means.

With the arrangement of FIGURE 13, the forming roller 24' may be biased radially outwardly relative to the mold cavity with a predetermined magnitude of force. During a forming operation, as the asbestos-cement material M builds up on the rotating surface of the mold cavity the radially inwardly directed pressure created by the build-up of such material will cause the forming roller 24' to be moved radially inwardly until the desired thickness of material is obtained. The density of the compressed asbestos-cement material M is controlled by the magnitude of force with which the forming roller 24' is biased towards the forming surface of the mold cavity.

Referring now to FIGURE 14, there is shown a preferred means for mixing asbestos-cement material in order that it may be utilized in carrying out the present invention. This means includes a spraying device, such as a conventional paint spray gun or the like 200, connected with a tube 202 and a source of water 204 connected to a second tube 205. The spray gun 200 sprays water into a tumbling device such as a conventional cement mixer, comprising an open-ended drum 206 of generally cylindrical shape preferably somewhat larger at one end than the other, the larger end generally being enclosed by a more or less spherical end piece 207 and the smaller end being formed with an opening 208 for receiving and discharging materials relative to the drum.

Inside of the drum 206 are formed flights 209 and/or ribs 209a which are arranged within the drum so that as the drum revolves the asbestos-cement material therewithin will be moved backward and forward and will also be carried partially around the drum and directionally upward each drum revolution and thereafter dropped freely, such material returning to the lower portion of the drum as a fine spray of water 210 is sprayed thereon through spray gun 200.

A suitable electric motor 220 effects rotation of the drum 206 by means of pulleys 222 and 223 connected by a belt 224. Drum 206 is mounted in the customary manner whereby it may be pivoted at point 226 so as to drop the wetted cement-asbestos material out of the opening 208 by operation of gravity after the proper amount of water has been added to such material.

By the use of the means shown in FIGURE 14 it is easy to spray the proper amount of water within close tolerances onto the dry asbestos-cement materials during the tumbling thereof within drum 206. As the initially dry material drops through the air repeatedly within the mixer it comes in contact with the fine water spray in the center of the mixer and thus each individual particle is given a uniform coating of water. The resultant mixture is a non-cohesive particulate mass with just the proper amount of moisture dispersed to and remaining in and on all individual articles. It will be understood that at the conclusion of the tumbling and wetting step the asbestos-cement mix will be ready for forming in the apparatus shown in FIGURES 1 through 7 or in the modified form shown in FIGURE 13. It should also be noted that this apparatus may be used to form hollow articles from plastic materials other than asbestos-cement.

While the embodiment specifically described herein is fully capable of achieving the objects and advantages described, many modifications will be clear to those skilled in the art without departing from the inventive concepts herein disclosed. It is not my intention to be restricted to the specific embodiments shown and described since the same are for illustrative purposes only.

I claim:

1. A method of forming a hollow article from a plastic material, that includes:
    providing a molding zone defined in part by a tubular surface;
    introducing an amount of said plastic material into said molding zone;
    rotating said tubular surface about an axis of rotation coinciding with the longitudinal axis of said tubular surface;
    inserting a roller into said molding zone, said roller having an axis of rotation parallel with the axis of rotation of said tubular surface;
    pressing said roller against said plastic material to compress said plastic material against said tubular surface;
    and power-rotating said roller in the same direction as said plastic material while it is being pressed against said plastic material at a surface speed that exceeds the surface speed of said plastic material at the area of contact between said roller and said plastic material.

2. A method as set forth in claim 1 wherein said tubular surface and said roller cooperate to define the profile of the completed article.

3. A method as set forth in claim 1 wherein said plastic material is progressively introduced into said molding zone as said tubular surface and said roller are rotated.

4. A method as set forth in claim 2 wherein said plastic material is progressively introduced into said molding zone as said tubular surface and said roller are rotated.

5. A method of forming a hollow article from a plastic material, said article having intersecting passages, that includes:
    providing a molding zone having a first tubular surface that intersects a second tubular surface, said tubular surfaces defining said passages;
    introducing an amount of said plastic material into the confines of said first and second tubular surfaces;
    pressing a power-rotated roller having an axis of rotation parallel with said first-mentioned axis of rotation against said plastic material to compress said plastic material against said first tubular surface while said first tubular surface is being rotated about an axis of rotation coinciding with the longitudinal axis of said first tubular surface, the surface speed of said roller exceeding the surface speed of said plastic material at the area of contact of said roller and said plastic material, said roller being rotated in the same direction as said plastic material;
    shifting the position of said molding zone whereby the longitudinal axis of said second tubular surface coincides with said first-mentioned axis of rotation;
    and pressing a power-rotated roller against that portion of said plastic material within said second tubular surface to compress said plastic material against said second tubular surface, the surface speed of said roller exceeding the surface speed of said plastic material at the area of contact of said roller and said plastic material, said roller being rotated in the same direction as said material.

6. A method as set forth in claim 5 wherein said tubular surfaces and said roller cooperate to define the profile of the completed article.

7. A method as set forth in claim 5 wherein said plastic material is progressively introduced into the confines of said tubular surfaces during rotation thereof to thereby progressively build up said plastic material on said tubular surfaces.

8. A method of forming a hollow article from a plastic material, said article having intersecting passages, that includes:
    providing a molding zone having a first tubular surface that intersects a second tubular surface, said tubular surfaces defining said passages;
    introducing an amount of said plastic material into the confines of said first and second tubular surfaces;
    pressing a power-rotated roller having an axis of rotation parallel with said first-mentioned axis of rotation against said plastic material to compress said plastic material against said first tubular surface while said first tubular surface is being rotated about an axis of rotation coinciding with the longitudinal axis of said first tubular surface, the surface speed of said roller exceeding the surface speed of said plastic material at the area of contact of said roller and said plastic material, said roller being rotated in the same direction as said plastic material;
    plugging the confines of said first tubular surface to positively support the plastic material in its formed configuration;
    shifting the position of said molding zone whereby the longitudinal axis of said second tubular surface coincides with said first-mentioned axis of rotation;
    and pressing a power-rotated roller against that portion of said plastic material within said second tubular surface to compress said plastic material against said second tubular surface, the surface speed of said roller exceeding the surface speed of said plastic material at the area of contact of said roller and said plastic material, said roller being rotated in the same direction as said material.

9. A method as set forth in claim 8 wherein said plastic material is progressively introduced into the confines of said tubular surfaces during rotation thereof to thereby progressively build up said plastic material on said tubular surfaces.

10. A method of forming a hollow article from a plastic material, said article having intersecting passages, that includes:
    providing a molding zone having a first tubular surface that intersects a second tubular surface, said surfaces defining said passages;
    providing a liner having an outer configuration corresponding to the inner configuration of said tubular surfaces;
    packing said lining with sufficient plastic material to form said article;
    positioning said packed lining within said molding zone;
    rotating said first tubular surface about an axis of rotation coinciding with the longitudinal axis of said first tubular surface;
    pressing a power-rotated roller having an axis of rotation parallel with said first-mentioned axis of rotation against the plastic material in the part of said liner disposed within the confines of said first tubular surface to compress said material against the interior of said liner towards said first tubular surface, the surface speed of said roller exceeding the surface speed of said material at the area of contact of said roller and said material, with said roller being rotated in the same direction as said material;

shifting the position of said molding zone whereby the longitudinal axis of said second tubular surface coincides with said first-mentioned axis of rotation;

rotating said second tubular surface about an axis of rotation coinciding with the longitudinal axis of said second tubular surface;

and pressing a power-rotated roller against the plastic material in the part of said liner disposed within the confines of said second tubular surface to compress said material against the interior of said liner towards said second tubular surface, the surface speed of said roller exceeding the surface speed of said material at the area of contact of said roller and said material, with said roller being rotated in the same direction as said material.

11. The method of claim 10 wherein a plug is inserted within the part of said liner disposed within the confines of said first tubular surface before said molding zone is shifted to positively support the plastic material within said liner part in its formed configuration.

References Cited by the Examiner

UNITED STATES PATENTS

| 882,538 | 3/08 | Sargent | 264—133 |
| 2,123,317 | 7/38 | Schless | 264—133 |
| 2,193,040 | 3/40 | Porter | 264—312 |
| 2,285,497 | 6/42 | Cuno | 264—312 |

FOREIGN PATENTS

| 214,827 | 4/61 | Austria. |
| 889,118 | 2/62 | Great Britain. |

ROBERT F. WHITE, *Primary Examiner.*

ALEXANDER H. BRODMERKEL, *Examiner.*

UNITED STATES PATENT OFFICE
CERTIFICATE OF CORRECTION

Patent No. 3,200,184                      August 10, 1965

Herbert C. Schulze

It is hereby certified that error appears in the above numbered patent requiring correction and that the said Letters Patent should read as corrected below.

Column 7, after line 70 and column 8, after line 36, insert the following:

> rotating said second tubular surface about an axis of rotation coinciding with said first-mentioned axis of rotation Signed and sealed this 26th day of September 1967.

(SEAL)
Attest:

ERNEST W. SWIDER                      EDWARD J. BRENNER
Attesting Officer                           Commissioner of Patents